UNITED STATES PATENT OFFICE.

LAUNCELOT W. ANDREWS, OF CHICAGO, ILLINOIS.

PROCESS FOR MANUFACTURING OXALATES.

1,280,622.  Specification of Letters Patent.  Patented Oct. 8, 1918.

No Drawing.  Application filed May 8, 1915. Serial No. 26,740.

*To all whom it may concern:*

Be it known that I, LAUNCELOT W. ANDREWS, a citizen of the United States, and a resident of Chicago, Cook county, and State of Illinois, have invented certain new and useful Improvements in Processes for Manufacturing Oxalates, of which the following is a specification.

The invention relates to the manufacture of alkali oxalates from alkali formates. As is well known, sodium or other alkali formate is converted into oxalate by the action of heat, whereby hydrogen gas is liberated and alkali oxalate produced. It is the present practice to add to the sodium (or other alkali) formate used, large amounts of inert substances such as sodium carbonate, sodium oxalate, charcoal powder, etc., or small amounts of free alkali, *i. e.*, sodium hydroxid, $NaOH$, or potassium hydroxid, $KOH$. The object of these additions is to increase the yield of oxalate and to secure better regulation and control of the reaction.

The present invention is based on the discovery of the fact that an admixture of a small amount of a suitable phosphate, preferably sodium or potassium phosphate, to the formate employed in the process, has a highly beneficial influence, in that it increases the yield of oxalate, renders the reaction less stormy, sudden, turbulent or explosive and more easily controlled, and avoids the introduction of large amounts of foreign material which must be subsequently separated from the product at considerable expense. The recovery of the small amount of phosphate required in the new procedure can be readily and inexpensively accomplished.

Preferably, di- or tri-alkali phosphate is employed, and, in accordance with the preferred procedure, disodium phosphate, $Na_2HPO_4$, or trisodium phosphate, $Na_3PO_4$, is used. The amount of alkali phosphate required does not exceed one or two per cent. of the weight of the formate used. For example, the improved process can be carried out as follows:—

Example: 500 pounds of sodium formate is intimately mixed with 7 pounds of trisodium phosphate, $Na_3PO_4$, which may contain water of crystallization or may be dry. The mixture is then heated to a suitable temperature, say about 380° C., until the reaction is complete. The action proceeds steadily and rapidly until near the end, when it becomes somewhat slower.

While the di- and tri-sodium and potassium phosphates are preferred and can be readily recovered from the alkali oxalate produced, the present invention contemplates as within its scope, the use of other soluble phosphates which act as catalyzers of the desired reaction and which do not contain bases which interfere with or act as anticatalyzers of the desired reaction. Furthermore, the term "phosphate" as herein used is to be understood, unless otherwise qualified, as designating any chemical compound containing the radicles characteristic of the various known phosphoric acids, as for example, of otho phosphoric acid, $H_3(PO_4)$, or pyro-phosphoric acid, $H_4(P_2O_7)$, or of meta phosphoric acid $H(PO_3)$, and it is recognized that the properties which make these compounds suitable for the purposes of the herein-described invention are due mainly to these acid or negative groups and only subordinately to the other elements present in the compound. As recognized above, however, certain phosphates cannot be used to advantage in the present improved process. These are the phosphates of bases which interfere with or act as anticatalyzers of the desired reaction, as for example, the phosphates of the so called "heavy metals."

It is obvious that changes may be made in the details set forth without departure from the essentials of the invention as defined in the claims.

I claim as my invention:—

1. The process of manufacturing oxalates by heating a mixture of formates and catalytic phosphates.

2. The process of manufacturing alkali metal oxalates, which consists in heating alkali metal formate admixed with catalytic phosphate.

3. The process of manufacturing alkali metal oxalates, which consists in heating alkali metal formate admixed with alkali metal phosphate.

4. The process of manufacturing alkali metal oxalates, which consists in heating an alkali metal formate admixed with polybasic alkali metal phosphate.

5. The process of manufacturing alkali metal oxalates, which consists in heating alkali metal formate admixed with a relatively small amount of polybasic phosphate of a common alkali metal.

LAUNCELOT W. ANDREWS.